(12) United States Patent
Sriram et al.

(10) Patent No.: US 6,459,722 B2
(45) Date of Patent: *Oct. 1, 2002

(54) PSEUDORANDOM NOISE GENERATOR FOR WCDMA

(75) Inventors: Sundararajan Sriram, Dallas, TX (US); Zhenguo Gu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 09/729,037

(22) Filed: Dec. 4, 2000

Related U.S. Application Data

(63) Continuation of application No. 09/460,995, filed on Dec. 14, 1999.
(60) Provisional application No. 60/114,346, filed on Dec. 29, 1998.

(51) Int. Cl.[7] .............................................. H04L 27/30
(52) U.S. Cl. .................... 375/130; 375/140; 708/252; 708/253; 714/728; 714/739
(58) Field of Search ................................. 375/130, 140, 375/141, 146, 147, 343, 367; 714/728, 781, 739; 708/250, 252, 253, 255

(56) References Cited

U.S. PATENT DOCUMENTS

| | | | | |
|---|---|---|---|---|
| 4,965,881 A | * | 10/1990 | Dilley | 359/158 |
| 5,046,036 A | * | 9/1991 | Tezuka | 708/253 |
| 5,446,683 A | * | 8/1995 | Mullen et al. | 708/256 |
| 5,532,695 A | * | 7/1996 | Park et al. | 341/173 |
| 5,596,516 A | * | 1/1997 | Higashi et al. | 708/250 |
| 5,638,309 A | * | 6/1997 | Negi | 708/250 |
| 5,910,907 A | * | 6/1999 | Chen et al. | 380/265 |
| 6,005,888 A | * | 12/1999 | Barron | 375/140 |
| 6,038,577 A | * | 3/2000 | Burshtein | 708/252 |
| 6,141,669 A | * | 10/2000 | Carleton | 375/130 |
| 6,173,009 B1 | * | 1/2001 | Gu | 375/150 |
| 6,188,714 B1 | * | 2/2001 | Yamaguchi | 375/130 |
| 6,192,385 B1 | * | 2/2001 | Shimada | 708/250 |
| 6,201,870 B1 | * | 3/2001 | Medard et al. | 380/46 |
| 6,275,520 B1 | * | 8/2001 | Nakamura et al. | 375/149 |
| 6,307,631 B1 | * | 10/2001 | Tazartes et al. | 356/460 |
| 6,396,896 B1 | * | 5/2002 | Lavi | 377/73 |

* cited by examiner

*Primary Examiner*—Stephen Chin
*Assistant Examiner*—Dac V. Ha
(74) *Attorney, Agent, or Firm*—Robert N. Rountree; Wade James Brady, III; Frederick J. Telecky, Jr.

(57) ABSTRACT

A circuit is designed with a plurality of logic circuits (370–374) for producing an offset state matrix. The circuit includes a first logic circuit (380–383) coupled to receive N elements of a respective row of a transition matrix and N elements of column of an input state matrix. The first logic circuit produces a multi-bit logical combination of corresponding bits of the respective row and the column. A second logic circuit (390) is coupled to receive the multi-bit logical combination and produces a respective element of the offset state matrix.

51 Claims, 4 Drawing Sheets

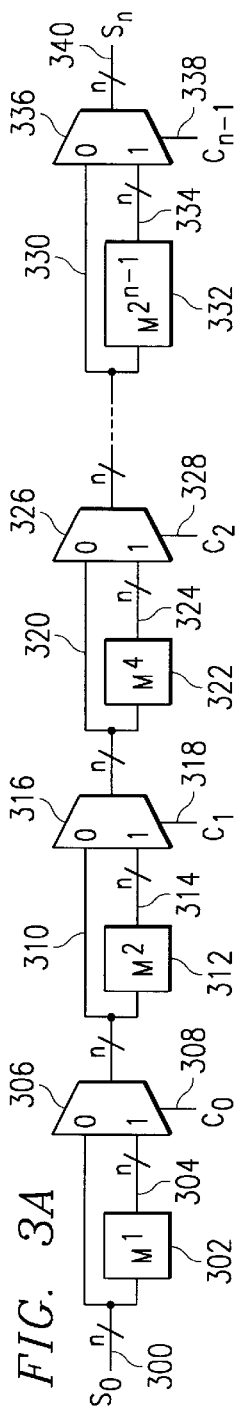
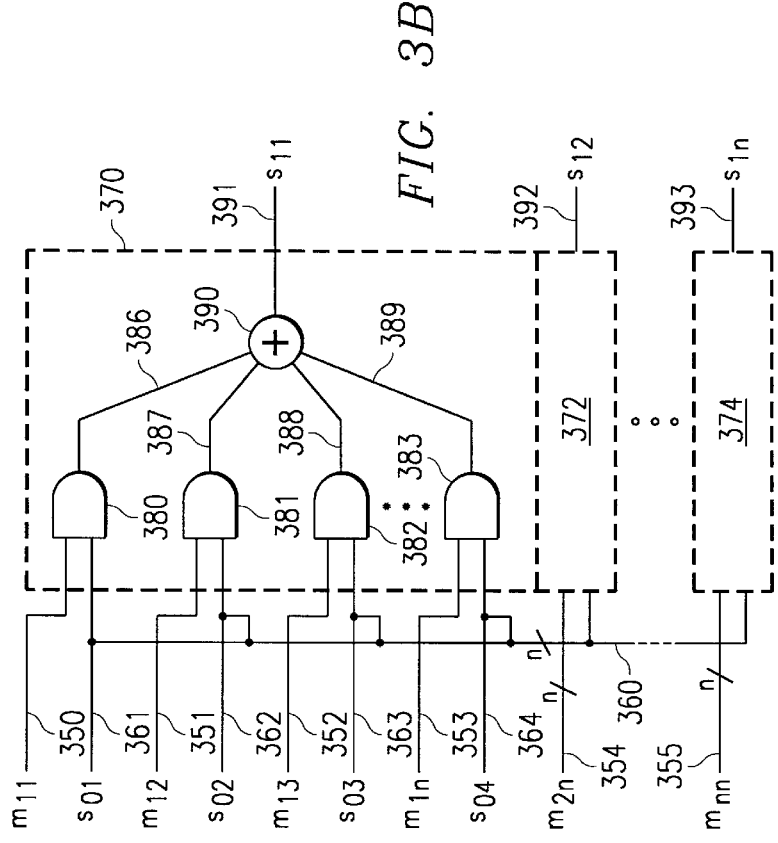
FIG. 3A
FIG. 3B

US 6,459,722 B2

1

PSEUDORANDOM NOISE GENERATOR FOR WCDMA

This application claims priority under 35 U.S.C. § 119 (e)(1) of provisional application Ser. No. 60/114,346, filed Dec. 29, 1998. This application is a continuation under 35 U.S.C § 120 of application Ser. No. 09/460,995, filed Dec. 14, 1999.

FIELD OF THE INVENTION

This invention relates to wideband code division multiple access (WCDMA) for a communication system and more particularly to a pseudorandom noise generator for generating a Long Code having an arbitrary delay.

BACKGROUND OF THE INVENTION

Present wideband code division multiple access (WCDMA) systems are characterized by simultaneous transmission of different data signals over a common channel by assigning each signal a unique code. This unique code is matched with a code of a selected receiver to determine the proper recipient of a data signal. Base stations in adjacent cells or transmit areas also have a unique pseudorandom noise (PN) code associated with transmitted data. This PN code or Long Code is typically generated by a Linear Feedback Shift Register (LFSR), also known as a Linear Sequence Shift Register, and enables mobile stations within the cell to distinguish between intended signals and interference signals from other base stations. Identification of a PN code requires the mobile station to correctly identify an arbitrary part of the received PN sequence. The identification is frequently accomplished by a sliding window comparison of a locally generated PN sequence with the received part of the PN sequence. The sliding window algorithm often requires the mobile station to efficiently calculate multiple offsets from the LFSR to match the received sequence.

In another application of an LFSR, the base station typically generates a PN sequence for the forward link by a combination of one or more LFSRs 100, 120 as in FIG. 1. The mobile unit is also generates a PN sequence for the reverse link with LFSR circuits 200, 220 as in FIG. 2. This PN sequence is used for quadrature phase shift keyed (QPSK) reverse link transmission. This transmission requires that the PN sequence be arbitrarily shifted by the number of chips equivalent to 250 microseconds for transmitting the in-phase component and the quadrature component. This arbitrary shift may vary with data rate.

Another application of an arbitrary offset LFSR arises for spreading and despreading transmitted signals as disclosed in U.S. Pat. No. 5,228,054 by Timothy I. Rueth and incorporated herein by reference. Rueth discloses an advantage of modulating each data bit at a constant chip rate for various transmit data rates. For example, a constant chip rate produces 128 chips for each bit at 9600 bits per second and 256 chips for each bit at 4800 bits per second. Thus, the chip rate may remain constant while the transmitted data rate may vary in response to rate information from a base station. Rueth further teaches that synchronization of base and mobile stations is simplified by inserting a zero in the PN sequence, thereby increasing the number of states from $2^N-1$ to $2^N$. Synchronization is further simplified by including an arbitrary offset circuit for the LFSR. Rueth teaches a mask circuit 30 in combination with an N-bit LFSR 10 (FIG. 2) for producing a PN offset with respect to the LFSR state. The mask circuit 30 produces the desired offset in response to a

2 mask signal MASK on bus 32. Rueth gives a specific example of a particular mask signal for a 10-chip offset for an exemplary 4-bit LFSR (col. 7, lines 37–40). Rueth, however, fails to teach or suggest how the mask signal is generated for this specific case or how the mask signal might be generated for an LFSR of arbitrary length. Rueth states that "it would be simplest to implement if the paired values of OFFSET and MASK were pre-computed and stored in a Read Only memory (ROM) not shown." (col. 8, lines 63–66). For a 15-bit LFSR, however, this would require $2^N-2$ (32,722) 15-bit masks. A particular problem with generation of this mask signal, therefore, is the need for a simple circuit to generate states with an arbitrary offset from an LFSR state. Other problems include the practical memory limitation of mobile handsets, calculation complexity of offset determination and speed and power requirements to generate the offset.

SUMMARY OF THE INVENTION

These problems are resolved by a circuit designed with a plurality of logic circuits for producing an offset state matrix. The circuit includes a first logic circuit coupled to receive N elements of a respective row of a transition matrix and N elements of column of an input state matrix. The first logic circuit produces a multi-bit logical combination of corresponding bits of the respective row and the column. A second logic circuit is coupled to receive the multi-bit logical combination and produces a respective element of the offset state matrix.

The present invention produces a state vector with an arbitrary offset from an initial state vector with minimal power and gate delay. Memory storage requirements for transition matrices are minimized.

BRIEF DESCRIPTION OF THE DRAWINGS

A more complete understanding of the invention may be gained by reading the subsequent detailed description with reference to the drawings wherein:

FIG. 3A is a block diagram of a PN generator circuit of the present invention;

FIG. 3B is a schematic diagram of an embodiment of a matrix multiplication circuit of FIG. 3A of the present invention;

DETAILED DESCRIPTION OF THE PREFERRED EMBODIMENTS

Figure 2:
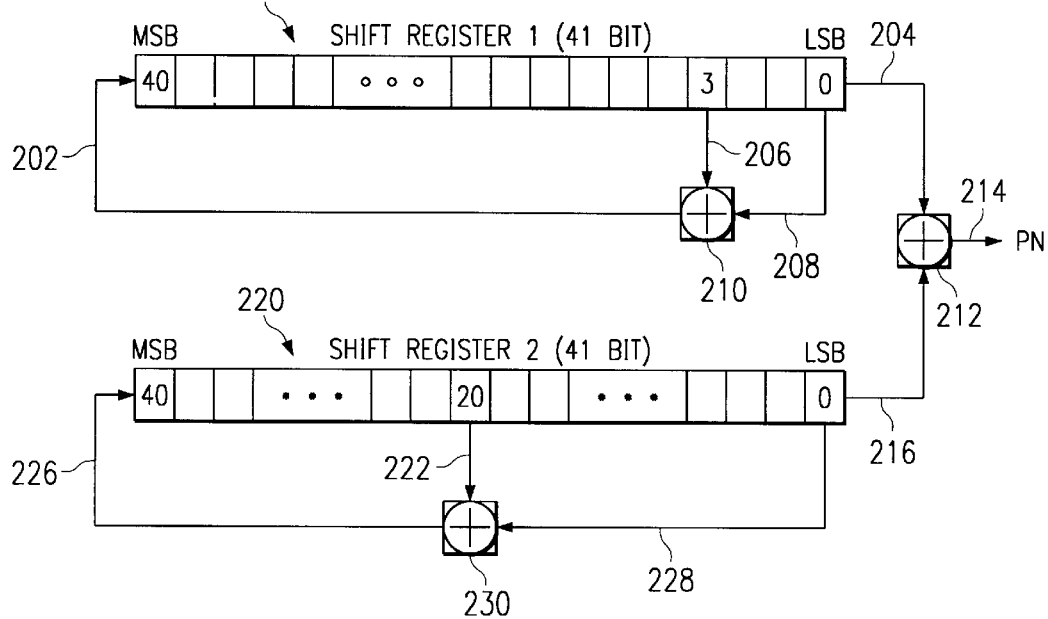
FIG. 2 is a simplified block diagram of another linear feedback shift register of the prior art.

Referring to FIG. 3A, there is a block diagram of a PN generator circuit of the present invention that may be used to generate an N-bit PN sequence corresponding to the LFSR 220 of FIG. 2. The N-stage PN generator circuit has $2^N-1$ or approximately $2.2 \times 10^{12}$ states. The PN generator circuit includes plural matrix generator circuits connected in series. The first matrix generator circuit receives an input state matrix $S_0$ on bus 300. The last matrix generator circuit in the series produces an output state matrix $S_n$ on bus 340. Each matrix generator circuit, for example the first matrix generator circuit, includes a matrix multiplication circuit 302 and a multiplex circuit 306. The matrix multiplication circuit is arranged to produce a matrix product of the respective input matrix and a respective stored matrix. The multiplex circuit produces one of the input state matrix and the matrix product in response to a respective count signal on lead 308.

In operation, the output state matrix $S_n$ on bus 340 of the PN generator circuit is a matrix multiplication product of the initial state matrix $S_0$ on bus 300 and a stored transition matrix. Alternatively, the stored transition matrix may be included in the matrix multiplication circuit as hard-wired combinatorial logic. This matrix multiplication is preferably a modulo-2 matrix multiplication for producing a state matrix or vector that is offset or delayed from the initial state matrix by the offset value. In general, this new state $S_n$ is determined by equation [1].

$$S_n = M^n S_0 \quad [1]$$

The state matrix $S_n$ is offset or delayed from initial state matrix $S_0$ by n states of the PN sequence. The transition matrix $M^n$ is an initial transition matrix $M_1$ raised to the power n. This transition matrix has a form determined by the PN sequence polynomial as will be explained in detail. A maximum length of the offset value is determined by a practical length of the total PN sequence as will be described in detail. The concept of the present invention, however, may be extended to any N-bit offset value for a corresponding N-stage LFSR. The offset value c on leads 308, 318, 328 and 338 may be represented in binary form as shown in equation [2].

$$n = c_{n-1} 2^{n-1} + c_{n-2} 2^{n-2} + \ldots + c_1 2^1 + c_0 2^0 \quad [2]$$

A transition matrix for producing an arbitrary offset n from initial state $S_0$ is then represented by equation [3].

$$M^n = (M^{2^{n-1}})^{c_{n-1}} \times (M^{2^{n-2}})^{c_{n-2}} \times \ldots \times (M^{2^2})^{c_2} \times (M^{2^0})^{c_0} \quad [3]$$

Any transition matrix having an arbitrary n exponent, therefore, may be calculated by storing the matrices of equation [3] in memory circuits of matrix multiplication circuits 302, 312, 322 and 332. Any zero-value bit of the offset value, for example bit $c_0$ on lead 308, produces the input state matrix $S_0$ at the respective output bus 310. Alternatively, a one-value bit $c_0$ of the delay value on lead 308 applies the matrix product on bus 304 of the respective transition matrix and the input matrix to the respective output matrix bus 310. This selective matrix multiplication continues at each matrix generator stage in response to the value of each respective bit of the offset signal. The final state matrix $S_n$ at bus 340 may be any arbitrary offset with respect to the input state matrix $S_0$ in response to the offset value.

This circuit is highly advantageous for efficiently producing a state vector having an arbitrary offset with respect to an initial state vector. Memory requirements are greatly reduced by storing only exponentially weighted matrices rather than the matrices for each desired offset. Moreover, computation time and power are minimized by use of combinatorial logic for modulo-2 matrix multiplication.

Referring now to FIG. 3B, there is a matrix multiplication circuit of the present invention that may be used with the matrix generator circuits of FIG. 3A. The matrix multiplication circuit includes n logic circuits 370–374 corresponding to elements of the state vector $s_{11}$–$s_{1n}$. Each logic circuit, for example logic circuit 370, receives row elements $m_{11}$–$m_{1n}$ of a respective transition matrix and column elements $s_{01}$–$s_{0n}$ of a respective input state matrix. The matrix multiplication circuit includes a first logic circuit 380–383 that performs a logical AND of corresponding row and column elements of the transition and state matrices, respectively. A second logic circuit 390 produces a logical exclusive-OR (XOR) of the multi-bit logical AND signal for each respective state matrix element $s_{11}$. This circuit is highly advantageous in producing a matrix product with minimal gate propagation delay. The transition matrix may be stored in a memory circuit (not shown) as previously described, thereby providing programmability.

Alternatively, each element of the state output matrix might be generated by Boolean minimization. For example, the 18-bit LFSR 100 of the prior art (FIG. 1) produces a PN polynomial as in equation [4] where offset value $C_7$ represents feedback tap 106.

$$G(x) = x^{18} + c_7 x^7 + 1 \quad (4)$$

An initial transition matrix $M^1$ for this PN polynomial has the form of equation [5]. The left column of the initial transition matrix includes zero elements $m_{0,0}$–$m_{17,0}$ and a one in element $m_{18,0}$. The I of equation [5] indicates a 17×17 square identity matrix having ones from the upper-left $m_{0,1}$ element along the diagonal to the lower-right $m_{17,18}$ element and zeros elsewhere. The 18-element vector c corresponds to coefficients of the PN polynomial of equation [4] in elements $m_{18,1}$–$m_{8,18}$. Only element $m_{18,7}$ corresponding to coefficient $C_7$, has a non-zero value.

$$M^1 = \begin{bmatrix} 0 & I \\ 1 & c \end{bmatrix} \quad [5]$$

Logic equations for each element of the matrix multiplication product of FIG. 3B have the general form of equation [6].

$$s_{(k+n),j} = \sum_i \sum_j r_{i,j} s_{k,j} \quad [6]$$

The predetermined form of the sparse transition matrix of equation [5], therefore, provides a highly advantageous matrix multiplication circuit. A first element of the offset state vector for the PN polynomial of equation [4], for example, is simply column element $s_{01}$, since row element $m_{01}$ is the only non-zero element in the first row of the initial transition matrix. Other matrix products are also realized with minimal logic due to the relatively sparse characteristic of each transition matrix. Thus, transition matrix storage as a hard-wired combinatorial logic circuit offers significant advantages in speed and simplicity and eliminates the need for programmable memory.

Figure 4:
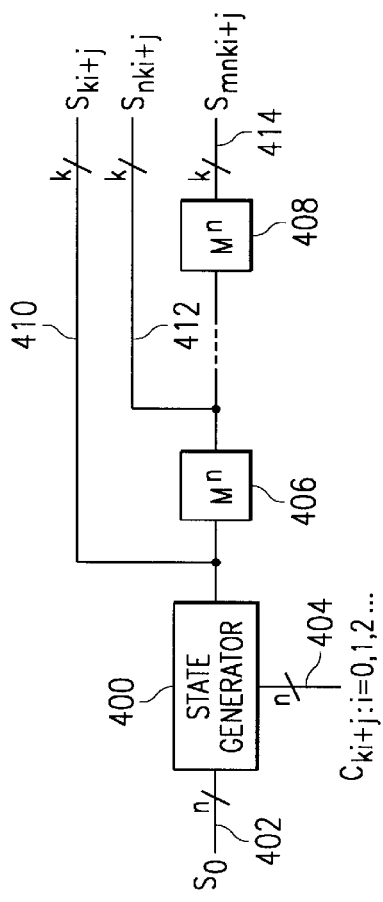
FIG. 4 is a block diagram of a state generator circuit of the present invention for producing a plurality of state matrices separated by a predetermined offset.

Turning now to FIG. 4, there is a block diagram of a state generator circuit of the present invention for producing a plurality of state matrices separated by a predetermined count or offset. The circuit includes a state matrix generator circuit as previously described in FIG. 3A. The state matrix generator circuit receives a state-input matrix $S_0$ on bus 402 and a count signal $C_{ki+j}$ on bus 404. The state matrix generator circuit produces a k-bit state matrix $S_n$ on bus 410 that is delayed from the state input matrix $S_0$ by a number of states in the count signal. A plurality of m transition matrix multiplication circuits 406–408, similar to circuits 302, 312, 322 and 332 (FIG. 3A), are connected in series. Each matrix multiplication matrix circuit 406–408 includes a transition matrix multiplication circuit having a predetermined order n. Each matrix multiplication circuit 406–408 produces a respective state matrix delayed from a respective state input matrix by this predetermined order.

In operation, the count signal $c_{ki+j}$ on bus 404 is initialized at a desired offset j. This initial count signal produces m output state matrices at buses 410, 412 and 414. Each output state matrix is delayed from the respective input state matrix by the predetermined order n of the transition matrix $M^n$. Index i is incremented to produce a count signal that is incremented in multiples of k from the initial offset j, where k is less than n. Thus, a sequence of m sets of state matrices are produced in parallel, each set having a predetermined offset from an adjacent set according to the order of the transition matrix $M^n$. Each set of the sequence further includes a sequence of k-bit state matrices. This circuit is highly advantageous in producing multiple PN sequences for matching with a received signal. Minimal logic is required and parallel sets are generated in a single clock cycle.

Figure 1:
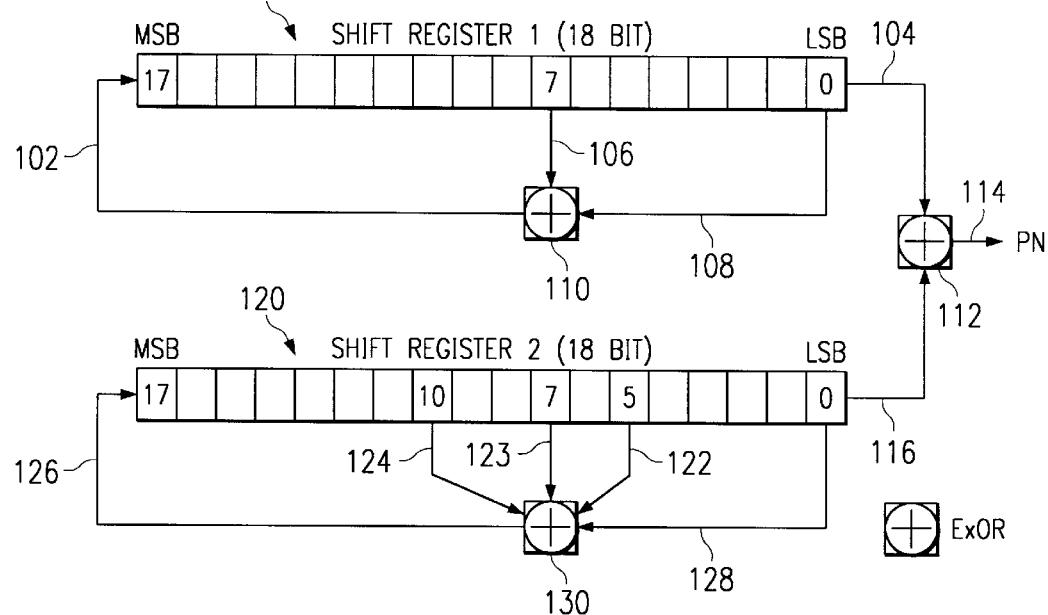
FIG. 1 is a simplified block diagram of a linear feedback shift register of the prior art.
Figure 5:
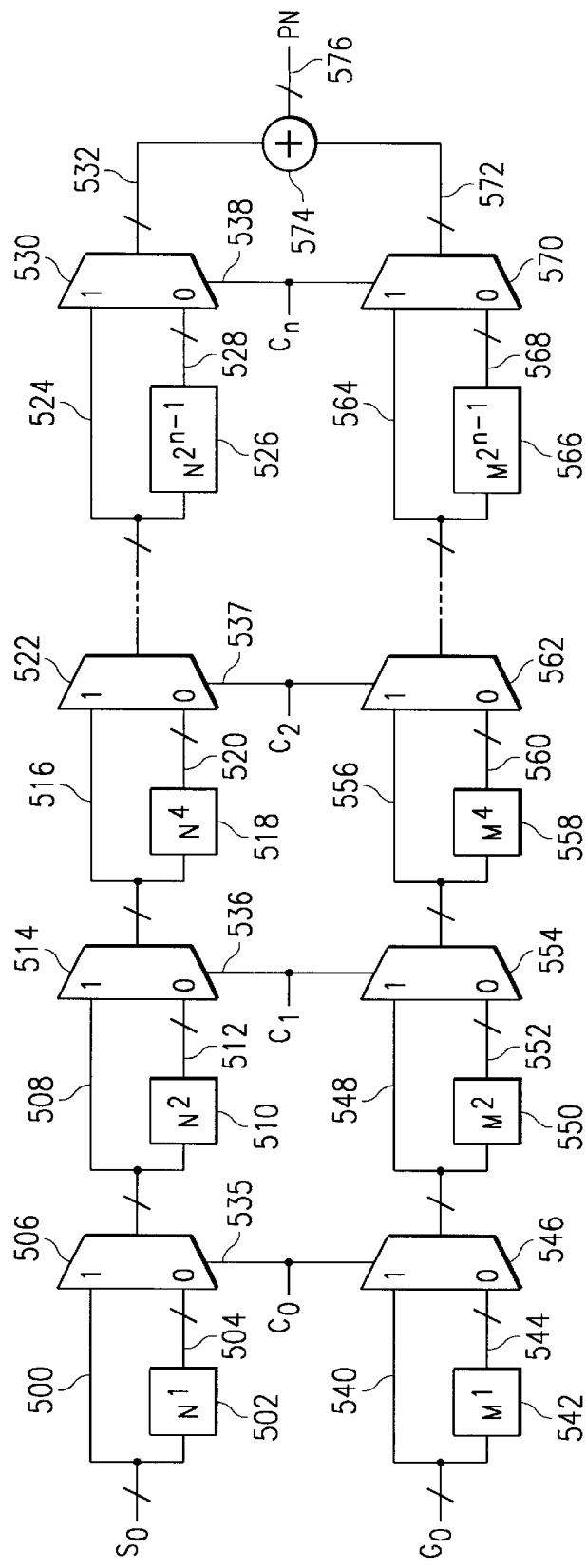
FIG. 5 is a block diagram of another embodiment of a PN generator of the present invention.

Referring now to FIG. 5, there is a block diagram of another embodiment of a PN generator of the present invention that may be used in lieu of the prior art circuit of FIG. 1 or FIG. 2. The PN generator circuit includes a first and a second series of matrix generator circuits arranged in parallel. Each series of matrix generator circuits includes preferably N stages having $2^N-1$ unique states. Each matrix generator circuit is similar to those previously described in FIG. 3A. Each matrix generator circuit includes, for example, a matrix multiplication circuit 502 and a multiplex circuit 506. The matrix multiplication circuit is arranged to produce a matrix product of the respective input matrix and a respective stored matrix. The multiplex circuit produces one of the input state matrix $S_0$ and the matrix product in response to a respective count signal $c_0$ on lead 535.

In operation, each matrix generator circuit of the first series includes a respective exponentially weighted transition matrix $N^1$–$N^{2n-1}$ having a form determined by a respective PN polynomial according to equation [5]. Likewise, the second corresponding series includes a respective exponentially weighted transition matrix $M^1$–$M^{2n-1}$ having a form determined by a respective PN polynomial according to equation [5]. The input state matrix $S_0$ for the first series of matrix multiplication circuits is preferably an all-one vector. The input state matrix $G_0$ for the second series of matrix multiplication circuits is preferably a Gold code sequence assigned to a specific base station. Corresponding matrix multiplication circuits from each of the first and second series receive a respective weighted count signal. This respective weighted count signal produces one of the respective input state matrix and the matrix product at a respective output bus as previously described. Each of the first and second series of matrix generator circuits produce respective output state matrices at buses 532 and 572, respectively, according to the count signal on leads 535–538. These respective output state matrices at buses 532 and 572 are applied to XOR circuit 576 to produce a PN sequence on bus 576 that is unique to the assigned Gold code and distinguished from that of other base stations in the receiving area. Thus, the PN generator circuit of the present invention is highly advantageous in producing a PN state in response to each count signal in a single clock cycle. Furthermore, speed and power are optimal with hard-wired transition matrix circuits.

A practical application of the previously described embodiments creates a need to generate modified PN sequences. These modified sequences include generation of truncated PN sequences and zero insertion in PN sequences as will be described in detail. The need to generate a truncated sequence arises when an application requires a periodic PN sequence that is a subset of a maximal length PN sequence. For example, an N-bit LFSR of the prior art has a maximal length of $2^N-1$, as previously described. Some applications, however, may require a periodic subset of length L, where L is less than $2^N-1$. In particular, WCDMA applications require generation of a periodic PN subset of length 40,960 from an 18-bit LFSR having a maximal length of 262,143. If the required PN sequence is generated one number at a time, then the circuit of the present invention simply counts to length L and restarts the count at zero, thereby producing the required PN subset. When the PN sequence is generated as a k-bit vector, however, the PN sequence may require truncation to preclude vector elements from exceeding the periodic length L.

Figure 6:
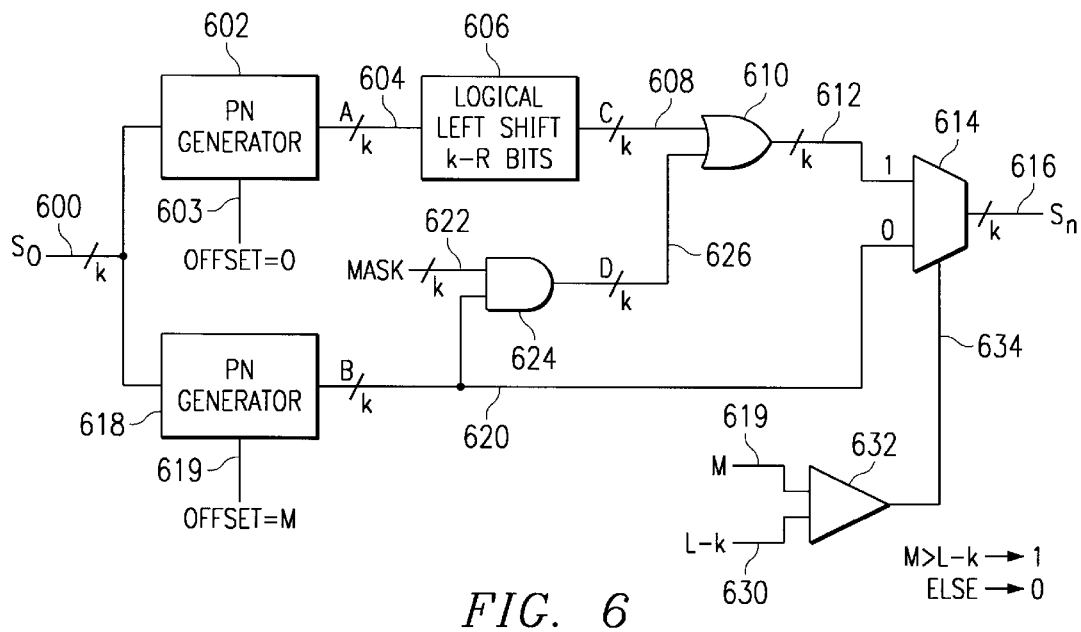
FIG. 6 is a schematic diagram of yet another embodiment of a PN generator of the present invention that may be used for truncated state or zero insertion sequences.

Referring now to FIG. 6, there is a block diagram of a circuit of the present invention for generating a truncated sequence. The circuit receives an input state matrix $S_0$ on bus 600. The PN generators 602 and 604 are the same as previously described in FIG. 3A, except that PN generator 602 receives offset or count signal zero at lead 603 and PN generator 618 receives offset of M at lead 619. The output of PN generator 602 is applied to shift register 606 via bus 604. The output of shift register 606 is subsequently applied to OR gate 610. The other input of OR gate 610 on bus 626 is an output of AND gate 624 produced by a combination of signal MASK on bus 622 and the output of PN generator 618 on bus 620. This output on bus 620 is also applied to multiplex circuit 614 together with the output of OR gate 610 on bus 612. Comparator circuit 632 compares offset M with the quantity L–k on lead 630 to produce a multiplex select signal on lead 634. If the offset M is greater than the quantity L–k, therefore, the signal on lead 634 is a logical one and the state matrix on bus 612 is produced as output state matrix $S_n$ on bus 616. Alternatively, if the signal on lead 634 is a logical zero, the state matrix on bus 620 is produced as output state matrix $S_n$ on bus 616.

Figure 7A:
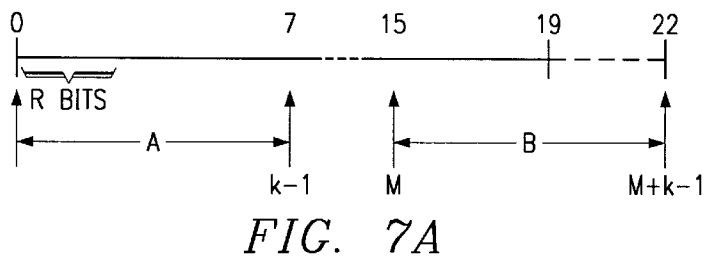
FIG. 7A is a diagram of elements of a PN sequence generated by the circuit of FIG. 6.
Figure 7B:
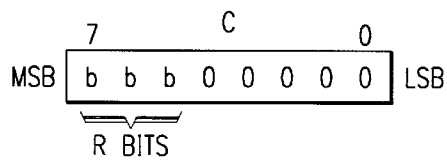
FIG. 7B is a diagram of a vector of an exemplary PN sequence generated by the circuit of FIG. 6.
Figure 7C:
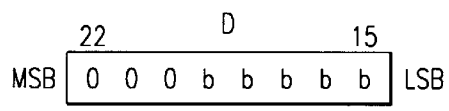
FIG. 7C is a diagram of another vector of the exemplary PN sequence generated by the circuit of FIG. 6.

Turning to FIG. 7A–7C, operation of the circuit of FIG. 6 will be explained in detail for a simplified example where L=20, k=8 and offset M=15. PN generator 602 receives a zero offset on lead 603 and produces state matrix A on bus 604, including 8 bits extending from bit 0 through bit 7. A value R=M–L+k or, for this specific example, R=15–20+8= 3, is calculated. Shift register 606 then produces a logical left shift of k–R or 5 bits of the matrix A on bus 604 to produce the matrix C (FIG. 7B) on bus 608.

Offset M on lead 619 produces a state matrix B at the output of PN generator 618 on bus 620, including 8 bits extending from bit 15 through bit 22. The three most significant bits 20–22, however, are outside the permissible periodic range zero through L–1. The value R applies zeros to the three most significant bits of signal MASK on bus 622 and ones elsewhere. Thus, AND gate 624 produces state matrix D on bus 626. OR gate 610 combines input state matrices on buses 608 and 626 to produce a modified state matrix on bus 612. This modified state matrix includes original bits 15–19 as the least significant bits and original bits 0–2 as the most significant bits. Comparator circuit 632 determines if offset M is greater than L–k. If so, multiplex circuit 614 applies the modified state matrix on bus 612 to output bus 616. Otherwise, multiplex circuit 614 applies the unmodified PN sequence on bus 620 to output bus 616. The resulting output state matrix $S_n$ on bus 616, therefore, is the same as the state matrix on bus 620 if the PN sequence is within the allowed range of values. Alternatively, when the PN sequence exceeds the allowed range of values, the output state matrix $S_n$ on bus 616 wraps around to continue the sequence at the beginning of the allowed PN sequence.

Although the invention has been described in detail with reference to its preferred embodiment, it is to be understood that this description is by way of example only and is not to be construed in a limiting sense. For example, the circuit of FIG. 6 may also be used to advantageously insert a zero into the PN sequence, thereby producing a sequence having $2^N$ states rather than $2^N-1$ states. Shifted and masked state matrices are produced on buses 608 and 626, respectively, as previously described. Comparator circuit 632 compares offset M to a predetermined offset for which zero insertion is desired. During normal operation, the state matrix on bus 620 is applied to output bus 616 via multiplex circuit 614. When a match is detected, multiplex circuit 614 applies a modified state matrix with inserted zero from bus 612 to output bus 616. Furthermore, any of the previously described embodiments may be implemented in software by a digital processor as will be appreciated by those of ordinary skill in the art having access to the instant specification. It is to be further understood that the inventive concepts of the present invention may be embodied in a mobile communication system as well as circuits within the mobile communication system. Moreover, numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A plurality of logic circuits connected in series for producing an offset state matrix, each logic circuit comprising:
    a first logic coupled to receive N elements of a respective row of a transition matrix and N elements of a respective column of an input state matrix, the first logic circuit producing a multi-bit logical combination of corresponding bits of the respective row and the column; and
    a second logic circuit coupled to receive the multi-bit logical combination, the second logic circuit producing a respective element of the offset state matrix.

2. A plurality of logic circuits as in claim 1, wherein the input state matrix is a vector and the offset state matrix is a vector.

3. A plurality of logic circuits as in claim 2, wherein the offset state matrix is a modulo-2 matrix multiplication product of the N elements of the respective row of the transition matrix and the N elements of the column of the input state vector.

4. A plurality of logic circuits as in claim 3, wherein the N elements of the respective row comprise hard-wired combinatorial logic.

5. A plurality of logic circuits as in claim 3, wherein each bit of the multi-bit logical combination is a logical AND of corresponding bits of the respective row of the transition matrix and the column of the input state vector and wherein the respective element of the offset state vector is a logical exclusive-OR of the multi-bit logical combination.

6. A circuit, comprising:
    a series of matrix generator circuits, a first matrix generator circuit in the series coupled to receive an input state matrix, a last matrix generator circuit in the series arranged to produce an output state matrix, each matrix generator circuit of the series comprising:
    a matrix multiplication circuit coupled to receive a respective input matrix, the matrix multiplication circuit arranged to produce a product of the respective input matrix and a respective stored matrix; and
    a multiplex circuit coupled to receive the respective input matrix, the respective product and a respective count signal, the multiplex circuit selectively producing one of the respective input matrix and the respective product in response to the respective count signal.

7. A circuit as in claim 6, wherein the product is a pseudorandom noise sequence.

8. A circuit as in claim 7, wherein the respective input matrix is an N-length vector and the respective stored matrix is an N×N matrix.

9. A circuit as in claim 8, wherein each said stored matrix of the series of matrix generator circuits is an exponentially weighted matrix, each respective exponent having a different value.

10. A circuit as in claim 9, wherein said each respective exponent has a value corresponding to the respective count signal.

11. A circuit as in claim 8, wherein each of the N×N matrix elements of the respective stored matrix comprises is a hard-wired combinatorial circuit.

12. A circuit, comprising:
    a first matrix generator circuit coupled to receive a first input state matrix and a count signal, the first matrix generator arranged to produce a first output state matrix having an offset from the input state matrix in response to the count signal; and
    a plurality of second matrix generator circuits coupled in series, a first in the series of second matrix generator circuits coupled to receive the first output state matrix, each second matrix generator circuit producing a respective output state matrix having a predetermined offset from a respective input state matrix.

13. A circuit as in claim 12, wherein each of the first input state matrix and the first output state matrix is an N-length vector.

14. A circuit as in claim 13, wherein the first output state vector is a modulo-2 matrix multiplication product of N elements of a respective row of a transition matrix and the N elements of the first input state vector.

15. A circuits as in claim 14, wherein the N elements of the respective row comprise hard-wired combinatorial logic.

16. A circuit as in claim 12, wherein each said second matrix generator circuit is coupled to receive a stored transition matrix and wherein the respective output state matrix is a modulo-2 matrix product of the stored transition matrix and the respective input state matrix.

17. A circuit as in claim 12, wherein the first matrix generator circuit further comprises:
    a series of matrix generator circuits, a first matrix generator circuit in the series coupled to receive the first input state matrix, a last matrix generator circuit in the series arranged to produce the first output state matrix, each matrix generator circuit of the series comprising:

a matrix multiplication circuit coupled to receive a respective input matrix, the matrix multiplication circuit arranged to produce a product of the respective input matrix and a respective stored matrix; and a multiplex circuit coupled to receive the respective input matrix, the respective product and a respective count signal, the multiplex circuit selectively producing one of the respective input matrix and the respective product in response to the respective count signal.

18. A circuit as in claim 17, wherein each said second matrix generator circuit further includes a respective stored transition matrix as a hard-wired combinatorial logic circuit and wherein the respective output state matrix is a modulo-2 matrix product of the stored transition matrix and the respective input state matrix.

19. A circuit for a communication system, comprising:
a first series of matrix generator circuits, a first matrix generator circuit in the first series coupled to receive a first input state matrix, a last matrix generator circuit in the first series arranged to produce a first output state matrix;
a second series of matrix generator circuits, a first matrix generator circuit in the second series coupled to receive a second input state matrix, a last matrix generator circuit in the second series arranged to produce a second output state matrix; and
a logic circuit coupled to the last matrix generator circuit in each of the first and second series, the logic circuit arranged to produce a pseudorandom noise sequence in response to the first output state matrix and the second output state matrix.

20. A circuit as in claim 19, wherein each said matrix generator circuit of the first series corresponds to a respective said matrix generator circuit of the second series.

21. A circuit as in claim 20, wherein each said matrix generator circuit of the first series is coupled to receive a count signal and each corresponding respective said matrix generator circuit of the second series is coupled to receive the count signal.

22. A circuit as in claim 21, wherein each matrix generator circuit in the first series includes a respective first exponentially weighted matrix, each first exponentially weighted matrix having a different exponent from other first exponentially weighted matrices and wherein each matrix generator circuit in the second series includes a respective second exponentially weighted matrix, each second exponentially weighted matrix having a different exponent from other second exponentially weighted matrices.

23. A circuit as in claim 22, wherein said each exponent of each matrix generator circuit of the first and second series corresponds to a respective said count signal.

24. A circuit as in claim 22, wherein each of the exponentially weighted matrices is a hard-wired combinatorial logic circuit.

25. A method of generating a matrix, comprising the steps of:
generating a first matrix having a predetermined number of elements, the first matrix characterized by a first offset;
generating a second matrix having the predetermined number of elements and different from the first matrix;
combining elements from the first matrix with elements from the second matrix, thereby producing a third matrix having the predetermined number of elements;
comparing the first offset with a predetermined value; and
producing one of the first and third matrices in response to the step of comparing.

26. A method as in claim 25, wherein each of the first, second, and third matrices are vectors.

27. A method as in claim 25, wherein the first offset is variable and wherein the second matrix is characterized by a second offset, the second offset having a predetermined value.

28. A method as in claim 25, wherein the step of combining comprises shifting at least one element of one of the first and second matrices and masking at least one element of the other of the first and second matrices.

29. A method as in claim 25, wherein each of the first and second matrices are stored in respective registers of a digital processor.

30. A method as in claim 29, wherein the step of combining comprises producing a logical OR of respective registers of the first and second matrices.

31. A method as in claim 25, wherein the first matrix comprises a contiguous sequence of elements from a predetermined pseudorandom sequence, and wherein the third matrix comprises a first contiguous sequence of elements and a second contiguous sequence of elements, wherein the first contiguous sequence is noncontiguous with the second sequence.

32. A method as in claim 31, wherein the predetermined pseudorandom sequence has a beginning and an end, and wherein the first contiguous sequence is proximate the beginning and the second contiguous sequence is proximate the end.

33. A method as in claim 31, wherein the first contiguous sequence is separated from the second contiguous sequence by a single element.

34. A method of producing a matrix, comprising the steps of:
applying a respective plurality of input matrices to a plurality of matrix multiplication circuits;
applying a plurality of control signals to the plurality of matrix multiplication circuits, each control signal corresponding to a respective matrix multiplication circuit;
producing a respective output matrix as a product of each respective input matrix and a respective predetermined matrix at each matrix multiplication circuit having a corresponding control signal of a first logic state;
producing each respective input matrix as a respective output matrix at each matrix multiplication circuit having a corresponding control signal of a second logic state; and
applying a plurality of the respective output matrices as the respective input matrices.

35. A method as in claim 34, wherein the plurality of matrix multiplication circuits are connected in series and wherein each input matrix is an output matrix from a respective preceding matrix multiplication circuit.

36. A method as in claim 35, wherein a final matrix multiplication circuit of the plurality of matrix multiplication circuits produces a pseudorandom noise sequence.

37. A method as in claim 34, wherein each said respective input matrix is an N-length vector and each said respective predetermined matrix is an N×N matrix.

38. A method as in claim 37, wherein each of the N×N matrix elements of the respective predetermined matrix comprises is a hard-wired combinatorial circuit.

39. A method as in claim 34, wherein the plurality of control signals is a control word, each bit of the control word having an exponentially weighted binary value.

40. A method as in claim 34, wherein the input matrices and the output matrices are stored in registers of a digital processor.

41. A sequence generator circuit coupled to receive an input matrix, a first offset signal and a select signal, the sequence generator comprising:

a first generator circuit arranged to produce a first output matrix corresponding to the input matrix and the first offset signal;

a second generator circuit arranged to produce a second output matrix;

a logic circuit coupled to receive the first and second output matrices, the logic circuit arranged to combine the first and second output matrices to produce a third output matrix; and a multiplex circuit arranged to produce one of the first and third output matrices in response to the select signal.

42. A circuit as in claim 41, wherein the input matrix is a first part of a PN sequence and wherein the first offset signal corresponds to an offset within the PN sequence.

43. A circuit as in claim 42, comprising a decision circuit arranged to produce the select signal having a first logic state when the input matrix includes an end of the PN sequence and having a second logic state when the input matrix excludes the end of the PN sequence.

44. A circuit as in claim 41, wherein the second generator circuit is a memory circuit.

45. A circuit as in claim 41, wherein the second generator circuit is a PN generator circuit coupled to receive the input matrix and a second offset signal, the PN generator circuit producing the second output matrix corresponding to the input matrix and the second offset signal.

46. A circuit as in claim 45, wherein the second offset signal is zero.

47. A circuit as in claim 41, wherein the logic circuit comprises:

a shift circuit arranged to shift one of the first and second output matrices, thereby producing a shifted output matrix;

a mask circuit arranged to combine the shifted output matrix with another of the first and second output matrices, thereby producing the third output matrix.

48. A method of producing a sequence, comprising the steps of:

producing a first part of a PN sequence, the first part having a predetermined length;

producing a second part of the PN sequence, the second part having the predetemined length;

shifting one of the first and second parts with respect to the other of the first and second parts; and combining the shifted one of the first and second parts with the other of the first and second parts, thereby producing an output sequence having the predetermined length.

49. A method as in claim 48, wherein the step of combining comprises inserting a zero in at least one position, thereby producing the output sequence having the predetermined length.

50. A method as in claim 48, comprising the steps of:

determining whether said one of the first and second parts is an end of the PN sequence; and producing, in response to the step of determining, one of a) said output sequence resulting from the step of combining and b) said one of the first and second parts.

51. A method as in claim 48, comprising the steps of producing a first offset signal and producing one of the first and second parts as an offset of the PN sequence in response to the first offset signal.

* * * * *